(12) United States Patent
Choung et al.

(10) Patent No.: US 8,048,393 B2
(45) Date of Patent: Nov. 1, 2011

(54) ZEOLITE CATALYST FOR REMOVING NITROGEN OXIDES, METHOD FOR PREPARING THE SAME, AND METHOD OF REMOVING NITROGEN OXIDES USING THE SAME

(75) Inventors: Jin Woo Choung, Suwon (KR); In-Sik Nam, Pohang (KR); Hyuk Jae Kwon, Pohang (KR); Young-Jin Kim, Ulsan (KR); Dae-Hwan Kang, Ulsan (KR); Moon-Soon Cha, Ansan (KR)

(73) Assignees: Hyundai Motor Company, Seoul (KR); Ordeg Co., Ltd., Seoul (KR)

( * ) Notice: Subject to any disclaimer, the term of this patent is extended or adjusted under 35 U.S.C. 154(b) by 0 days.

(21) Appl. No.: 12/628,370

(22) Filed: Dec. 1, 2009

(65) Prior Publication Data

US 2010/0143228 A1 Jun. 10, 2010

(30) Foreign Application Priority Data

Dec. 5, 2008 (KR) .................. 10-2008-0123578

(51) Int. Cl.
- B01D 53/56 (2006.01)
- B01D 53/94 (2006.01)
- B01J 29/40 (2006.01)
- B01J 37/02 (2006.01)
- B01J 29/46 (2006.01)
- B01J 29/48 (2006.01)

(52) U.S. Cl. ............... 423/213.5; 423/239.2; 423/700; 502/66; 502/74

(58) Field of Classification Search ............... 423/213.5, 423/239.2, 700; 502/66, 74
See application file for complete search history.

(56) References Cited

U.S. PATENT DOCUMENTS

| | | | |
|---|---|---|---|
| 6,912,847 B2 * | 7/2005 | Deeba ............... | 60/297 |
| 6,921,732 B2 * | 7/2005 | Vempati ............ | 502/66 |
| 6,953,763 B2 * | 10/2005 | Vempati et al. .... | 502/66 |
| 7,691,769 B2 * | 4/2010 | Ott ................... | 502/74 |
| 2009/0048095 A1 * | 2/2009 | Li et al. ............ | 502/74 |

FOREIGN PATENT DOCUMENTS

| WO | WO-2006/031297 A2 | 3/2006 |
|---|---|---|
| WO | WO-2008/085265 A1 | 7/2008 |
| WO | WO-2009/155063 A1 | 12/2009 |

OTHER PUBLICATIONS

Shi et al: "Low-temperature decomposition of NOx over Fe-Mn/H-beta catalysts in the presence of oxygen" Catalysis Communications, Elsevier Science, Amsterdam, NL, vol. 9, No. 6, (Dec. 4, 2007), pp. 1356-1359, XP022490053 ISSN: 1566-7367.
European Search Report, European Application No. 09177610.4-1270; Feb. 8, 2010.

* cited by examiner

*Primary Examiner* — Timothy Vanoy
(74) *Attorney, Agent, or Firm* — Edwards Angell Palmer & Dodge LLP; Peter F. Corless

(57) ABSTRACT

A zeolite catalyst for removing nitrogen oxides is provided, in which 5 to 30 wt % of manganese (Mn) and 2 to 20 wt % of iron (Fe) on the basis of the total weight of the catalyst are supported on zeolite, and a method for preparing the same, and a method for removing nitrogen oxides using the same are provided.

6 Claims, 2 Drawing Sheets

ZEOLITE CATALYST FOR REMOVING NITROGEN OXIDES, METHOD FOR PREPARING THE SAME, AND METHOD OF REMOVING NITROGEN OXIDES USING THE SAME

CROSS-REFERENCE TO RELATED APPLICATION

This application claims priority to and the benefit of Korean Patent Application No. 10-2008-0123578 filed on Dec. 5, 2008, the entire contents of which are incorporated herein by reference.

BACKGROUND (a) Field of the Invention

The present invention relates to a zeolite catalyst for removing nitrogen oxides, a method for manufacturing the same, and a method for removing nitrogen oxides using the same, in which zeolite is used as a carrier, and manganese (Mn) and iron (Fe) are used as an active component.

(b) Description of the Related Art

In general, in exhaust gas of diesel vehicles, carbon monoxide, hydrocarbon, and nitrogen oxides are included as harmful materials. Nitrogen oxides cause environmental problems such as photochemical smog and acid rain, as well as human diseases.

Selective catalytic reduction (SCR) method, in which a reducing agent such as ammonia ($NH_3$), urea, hydrocarbon (HC), and the like, and various catalysts are used, is effective to remove nitrogen oxides. Ammonia ($NH_3$) has been know to be effective in removing nitrogen oxides from a fixed object such as a power plant and an incinerator. In case of a moving object such as a vehicle, however, urea has been known to be effective as it is capable of being easily decomposed to ammonia by heat decomposition and a hydration reaction.

Meanwhile, as the catalyst for use in the selective catalyst reduction method, zeolite-based catalysts such as copper (Cu)/zeolite having excellent functions and vanadia ($V_2O_5$)/titania ($TiO_2$)-based metal oxide catalysts have been developed. Copper (Cu) and Vanadium (V) contained in the catalysts, however, negatively affect human health.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a zeolite catalyst for removing nitrogen oxides that has an excellent nitrogen oxide removal ratio and a minimum effect on human health, and a method for manufacturing the same.

In a zeolite catalyst for removing nitrogen oxides according to an exemplary embodiment of the present invention, about 5 to about 30 wt % of manganese (Mn) and about 2 to about 20 wt % of iron (Fe), on the basis of the total weight of the catalyst, are supported on zeolite as an active material by using an impregnation method.

A method for manufacturing a zeolite catalyst according to an exemplary embodiment of the present invention includes the steps of supporting on zeolite about 5 to about 30 wt % of manganese (Mn) and about 2 to about 20 wt % of iron (Fe) on the basis of the total weight of the catalyst by using a mixture solution of manganese (Mn) and iron (Fe), and then drying and sintering the supported catalyst.

The sintering may be performed under an air or oxygen atmosphere at a temperature in the range of about 300 to about 500° C.

A method for removing nitrogen oxides according to an exemplary embodiment of the present invention includes the step of removing nitrogen oxides by a reduction reaction generated while exhaust gas including the nitrogen oxides is mixed with a reducing agent and the mixture passes through a catalyst reactor to which a zeolite catalyst is applied.

The reducing agent may be one of ammonia and urea. The reduction reaction may be performed at a temperature in the range of about 140 to about 500° C. and a space velocity in the range of about 100 to about 400,000 $h^{-1}$. The nitrogen oxides removal ratio may be in the range of about 90 to about 100% at a reaction temperature in the range of about 180 to about 400° C.

The zeolite catalyst according to the present invention does not negatively environmentally affect a human body, and has an excellent nitrogen oxide removal ratio as compared to a known copper/zeolite catalyst and vanadia/titania catalyst.

The above and other features and advantages of the present invention will be apparent from or are set forth in more detail in the accompanying drawings, which are incorporated in and form a part of this specification, and the following Detailed Description, which together serve to explain by way of example the principles of the present invention.

DETAILED DESCRIPTION

Figure 1:
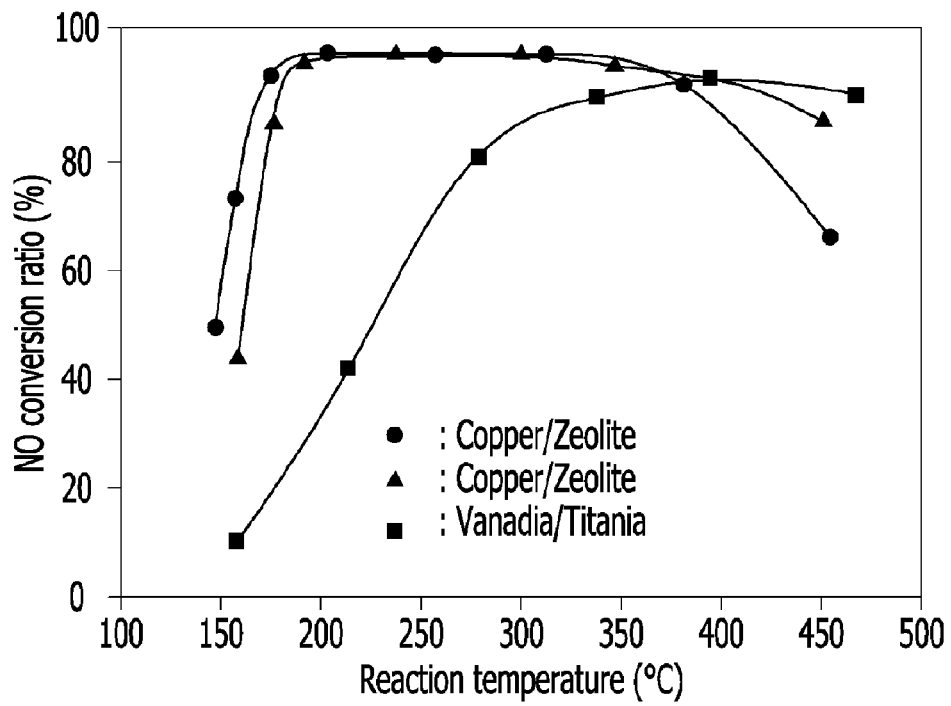
FIG. 1 is a graph illustrating a nitrogen monoxide (NO) removal ratio according to reaction temperature in Example 1 and Comparative Example 1.

Reference will now be made in detail to embodiments of the present invention, examples of which are illustrated in the drawings attached hereinafter, wherein like reference numerals refer to like elements throughout. The embodiments are described below so as to explain the present invention by referring to the figures.

The present invention provides a zeolite catalyst for removing nitrogen oxides, a method for preparing the same, and a method for removing nitrogen oxides using the same.

A zeolite catalyst for removing nitrogen oxides according to the present invention is manufactured by using an impregnation method by supporting manganese (Mn) and iron (Fe) as active components on zeolite.

In the present invention, an impregnation method, rather than an ion exchange method, is used to the manufacturing of the zeolite catalyst. Therefore, although the Si/Al molar ratio of zeolite used in Examples is 14, the Si/Al molar ratio of zeolite need not be limited to the specific value.

Manganese (Mn) that is used as the active component is supported in zeolite in an amount of about 5 to about 30 wt % on the basis of the total weight of the zeolite catalyst. When the content of manganese is less than 5 wt % or more than 30 wt %, there is a problem in that the nitrogen oxides removal ratio at a temperature range of a low temperature to a high temperature is reduced.

Iron (Fe) that is used as the active component serves to increase the removing activity of nitrogen oxides of manganese (Mn) as a co-catalyst. Iron is supported in zeolite in a content of about 2 to about 20 wt % on the basis of the total weight of the zeolite catalyst.

A method for manufacturing a zeolite catalyst for removing nitrogen oxides according to the present invention includes the steps of supporting on zeolite 5 to 30 wt % of manganese (Mn) and 2 to 20 wt % of iron (Fe) on the basis of the total weight of the catalyst by using a mixture solution of manganese (Mn) and iron (Fe), and then drying and sintering the supported catalyst.

The mixture solution of manganese (Mn) and iron (Fe) may be manufactured by using distilled water in an amount that is the same as a pore volume of the zeolite. Thereby, a more accurate amount of active components can be supported in zeolite.

The sintering is performed under an air or oxygen atmosphere at a temperature in the range of 300 to 500° C. If this condition is satisfied, it is possible to stabilize the active components on the catalyst and minimize a change in catalyst activity according to the reaction. In addition, by providing the atmosphere that is capable of containing more oxygen, it is possible to prevent the active components from being agglomerated or crystallized, and as a result, amorphous active components may be maintained. This improves the nitrogen oxides removal ratio.

A method for removing nitrogen oxides according to the present invention includes a reduction reaction generated while exhaust gas including the nitrogen oxides is mixed with a reducing agent and the mixture passes through a catalyst reactor to which a zeolite catalyst manufactured according to the present invention is applied.

Ammonia or urea may be used as the reducing agent. The amount of ammonia or urea used can be appropriately controlled according to the amount and the concentration of nitrogen oxides that will be removed.

The reduction reaction may be carried out at a temperature in the range of 100 to 500° C. and a space velocity in the range of 100 to 400,000 $h^{-1}$. If these conditions are satisfied, an excellent nitrogen oxides removal ratio may be obtained. As a result of the reduction reaction, nitrogen oxides in the exhaust gas are reduced into nitrogen and water, thereby being removed.

The zeolite catalyst according to the present invention shows an excellent nitrogen oxides removal ratio within a wide temperature range. Particularly, the zeolite catalyst according to the present invention shows a removal ratio in the range of 90 to 100% at a reaction temperature in the range of 180 to 400° C.

Example 1

Manganese nitroxide ($MnNO_{32}.4H_2O$) and iron nitroxide ($FeNO_{33}.9H_2O$) that are precursors were mixed with 9 mL of an aqueous solution to manufacture the mixture solution so that the weight ratio of manganese (Mn) was 20% and the weight ratio of iron (Fe) 10%, and these were impregnated in 7 g of zeolite ZSM5 (Tosho Co., Si/Al molar ratio: 14). Thereafter, it was dried at 11° C. for 12 hours, and calcined under an air atmosphere at 500° C. for 5 hours to manufacture a manganese (Mn)-iron (Fe)/zeolite catalyst.

Figure 2A:
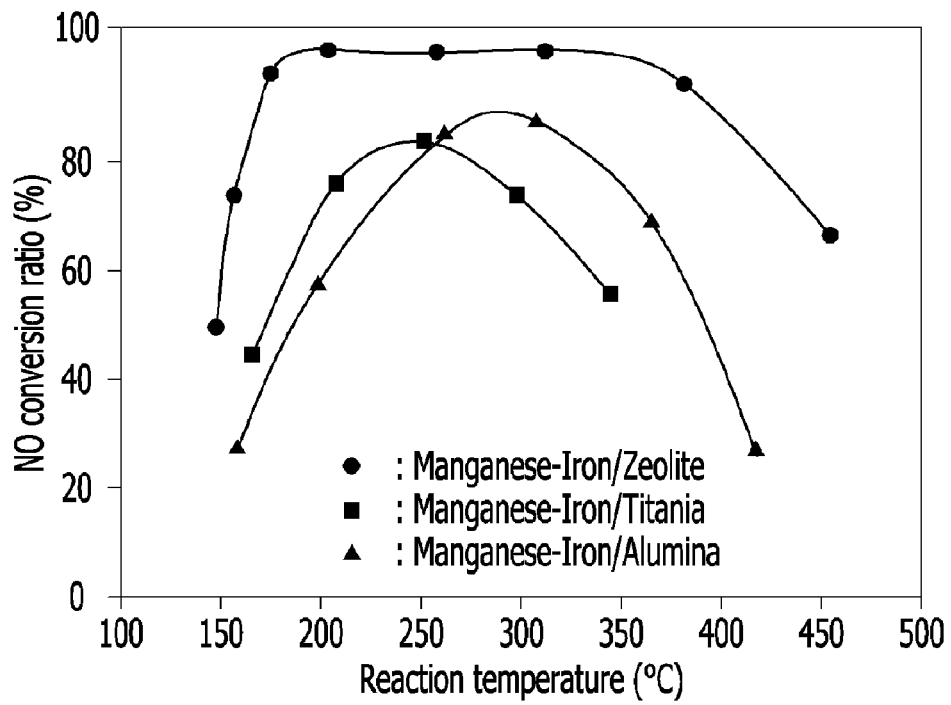
FIG. 2A is a graph illustrating a nitrogen monoxide (NO) removal ratio according to reaction temperature in Example 1 and Comparative Example 2.

In order to measure the nitrogen oxides removal ratio of the manufactured zeolite catalyst, the gas composition that was mixed with nitrogen monoxide (NO) at 500 ppm, ammonia ($NH_3$) at 500 ppm, oxygen at 5%, and water ($H_2O$) at 10% was passed through a prepared reactor that was provided with a catalyst bed including 1 g of the zeolite catalyst. At this time, in the reactor, the reduction reaction was carried out at a temperature in the range of 150 to 500° C. and a space velocity of 100,000 $h^{-1}$. The nitrogen oxides removal ratio according to the reaction temperature of the zeolite catalyst is illustrated in FIG. 1 and FIG. 2A.

Comparative Example 1

For comparison with Example 1, a copper (Cu)/zeolite catalyst and a vanadia ($V_2O_5$)/titania ($TiO_2$) catalyst were manufactured.

In order to manufacture the copper (Cu)/zeolite catalyst, 15 g of zeolite ZSM5 (Tosho Co., Si/Al molar ratio: 14) was mixed with 1 L of a copper acetate ($Cu(CH_3CO_2)_2$) aqueous solution, and this was ion exchange reacted with agitation at room temperature for 6 hours, then filtered and washed with distilled water and dried. The ion exchange reaction process was repeated three times, and the product was calcined at 500° C. for 5 hours to manufacture the copper (Cu)/zeolite catalyst in which the copper ion content was about 3%.

The vanadia ($V_2O_5$)/titania ($TiO_2$) catalyst was manufactured by using the impregnation method. More particularly, ammonium-vanadate in an amount that was calculated so as to support 2 wt % of vanadium (V) therein was dissolved in distilled water at a temperature in the range of 60 to 70° C., controlled by using oxalic acid ($(COOH)_2$) so that the pH was in the range of 2.5 to 3.0, mixed with titania, impregnated therein, dried, and calcined at 500° C. for 5 hours to manufacture a vanadia ($V_2O_5$)/titania ($TiO_2$) catalyst.

The results of the nitrogen oxides removal ratio of the copper (Cu)/zeolite catalyst and the vanadia ($V_2O_5$)/titania ($TiO_2$) catalyst were obtained by using the same method as in Example 1, and is shown in FIG. 1.

Comparative Example 2

In order to examine the effect of the carrier on the nitrogen oxide removal ratio, the same active component and content ratio as in Example 1 were used. Alumina ($Al_2O_3$) and titania ($TiO_2$) were used as carriers to manufacture a manganese (Mn)-iron (Fe)/alumina ($Al_2O_3$) catalyst and a manganese (Mn)-iron (Fe)/titania ($TiO_2$) catalyst. The carriers were impregnated by using the same method as in Example 1, except that alumina ($Al_2O_3$) and titania ($TiO_2$) were used, and were dried and calcined.

The nitrogen oxides removal activity was obtained by using the same method as in Example 1, and the results thereof are shown in FIG. 2A.

Result Comparison

FIG. 1 is a graph that illustrates the nitrogen monoxide (NO) removal ratio of according to the reaction temperature in Example 1 and Comparative Example 1. In FIG. 1, ● represents the manganese (Mn)-iron (Fe)/zeolite catalyst according to Example 1, ▲ represents the copper (Cu)/zeolite catalyst according to Comparative Example 1, and ■ represents the vanadia ($V_2O_5$)/titania ($TiO_2$) catalyst according to Comparative Example 1.

With reference to FIG. 1, the removal ratio of the manganese (Mn)-iron (Fe)/zeolite catalyst of Example 1 is similar to the removal ratio of the copper (Cu)/zeolite catalyst of Comparative Example 1 with the exception of the specific high temperature, and is significantly higher than the removal ratio of the vanadia ($V_2O_5$)/titania ($TiO_2$) catalyst. Particularly, the manganese (Mn)-iron (Fe)/zeolite catalyst of Example 1 shows a higher active reaction than the copper (Cu)/zeolite catalyst that shows excellent activity at low temperatures.

Figure 2B:
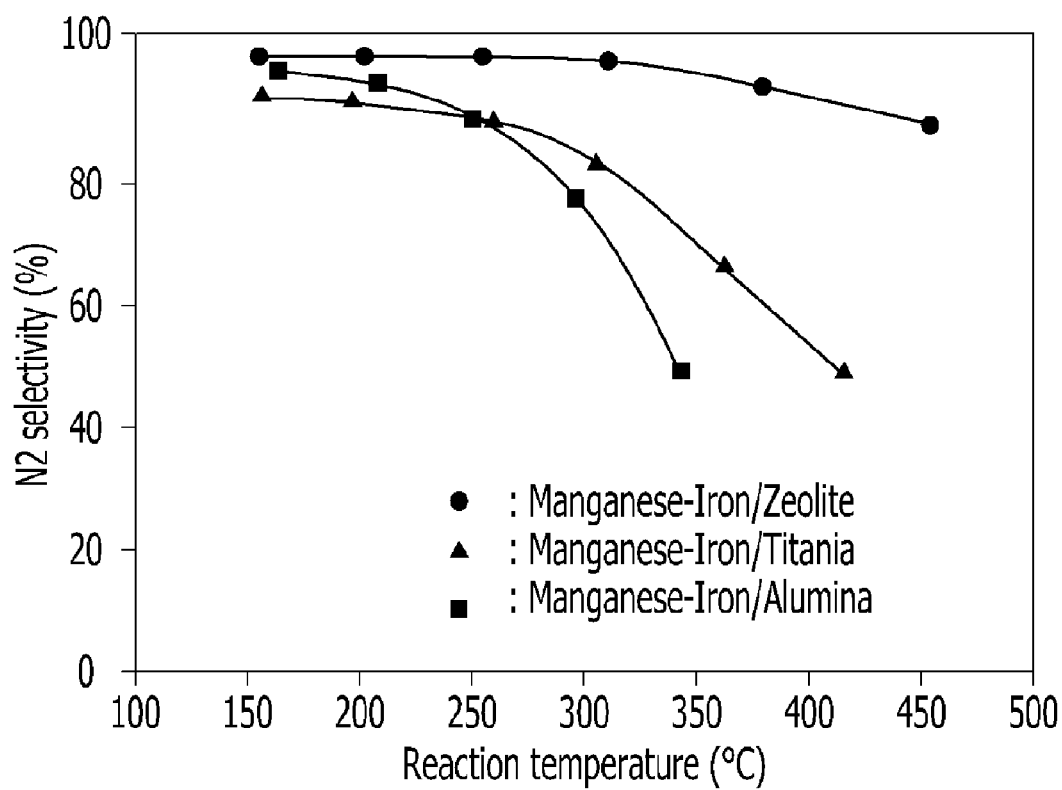
FIG. 2B is a graph illustrating selectivity of nitrogen according to reaction temperature in Example 1 and Comparative Example 2.

FIG. 2A is a graph that illustrates the nitrogen monoxide (NO) removal ratio of according to the reaction temperature in Example 1 and Comparative Example 2, and FIG. 2B is a graph that illustrates selectivity of nitrogen according to the reaction temperature in Example 1 and Comparative Example 2. In FIG. 2A and FIG. 2B, ● represents the manganese (Mn)-iron (Fe)/zeolite catalyst according to Example 1, ▲ represents the manganese (Mn)-iron (Fe)/alumina ($Al_2O_3$) catalyst according to Comparative Example 2, and ■ represents the manganese (Mn)-iron (Fe)/titania ($TiO_2$) catalyst according to Comparative Example 2.

With reference to FIG. 2A, it can be seen that the manganese (Mn)-iron (Fe)/zeolite catalyst of Example 1 using zeolite as the carrier has an excellent removing ratio of nitrogen monoxide (NO) at a wide temperature range as compared to the manganese (Mn)-iron (Fe)/alumina ($Al_2O_3$) catalyst and manganese (Mn)-iron (Fe)/titania ($TiO_2$) catalyst according to Comparative Example 2.

With reference to FIG. 2B, in the manganese (Mn)-iron (Fe)/zeolite catalyst of Example 1 using zeolite as the carrier, since the amount of nitrous oxide ($N_2O$) and nitrogen dioxide ($NO_2$) that were generated through the side reaction was very small, it can be seen that it has better nitrogen ($N_2$) selectivity as compared to the manganese(Mn)-iron(Fe)/alumina ($Al_2O_3$) catalyst and manganese(Mn)-iron(Fe)/titania ($TiO_2$) catalyst according to Comparative Example 2.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for manufacturing a zeolite catalyst for removing nitrogen oxides, the method comprising the steps of:
    providing a mixture solution of manganese (Mn) and iron (Fe) such that the weight ratio of manganese (Mn) to the total weight of the catalyst is about 5% to about 30% and the weight ratio of iron (Fe) to the total weight of the catalyst is about 2% to about 20%;
    supporting the mixture solution on zeolite ZSM5, by using an impregnation method, so that a mixture of manganese (Mn) and iron (Fe) is formed on the zeolite; and
    drying and sintering the supported catalyst.

2. The method for manufacturing a zeolite catalyst for removing nitrogen oxides of claim 1, wherein
    the sintering is performed under an air or oxygen atmosphere at a temperature in the range of about 300° C. to about 500° C.

3. A method for removing nitrogen oxides, comprising the steps of:
    mixing an exhaust gas including nitrogen oxides with a reducing agent; and
    passing the exhaust gas mixture through a catalyst reactor containing a zeolite catalyst to allow reduction reaction to be performed, wherein the zeolite catalyst has a mixture supported on the zeolite catalyst surface, by an impregnation method, the mixture including manganese (Mn) and iron (Fe) such that the weight ratio of manganese (Mn) to the total weight of the catalyst is about 5% to about 30% and the weight ratio of iron (Fe) to the total weight of the catalyst is about 2% to about 20%.

4. The method for removing nitrogen oxides of claim 3, wherein the reducing agent is ammonia or urea.

5. The method for removing nitrogen oxides of claim 3, wherein the reduction reaction is performed at a temperature in the range of about 140° C. to about 500° C. and a space velocity in the range of about 100 h-1 to about 400,000 h-1.

6. The method for removing nitrogen oxides of claim 3, wherein the removal ratio of the nitrogen oxides is in the range of about 90% to about 100% at a reaction temperature in the range of 180° C. to 400° C.

* * * * *